United States Patent
Kurosawa et al.

(10) Patent No.: US 7,915,844 B2
(45) Date of Patent: Mar. 29, 2011

(54) MOTOR DRIVING APPARATUS AND METHOD FOR CONTROL OF MOTOR REVOLUTION

(75) Inventors: Minoru Kurosawa, Tokyo (JP);
Yasuhiko Kokami, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 474 days.

(21) Appl. No.: 12/138,103

(22) Filed: Jun. 12, 2008

(65) Prior Publication Data
US 2009/0072773 A1    Mar. 19, 2009

(30) Foreign Application Priority Data
Aug. 23, 2007    (JP) .................... 2007-216610

(51) Int. Cl.
*H02K 29/10*    (2006.01)
(52) U.S. Cl. .............. 318/400.4; 318/689; 318/461
(58) Field of Classification Search ............... 318/400.4, 318/689, 561, 135, 466, 461, 599, 603, 727, 318/700, 720
See application file for complete search history.

(56) References Cited

U.S. PATENT DOCUMENTS
5,134,487 A *  7/1992  Taguchi et al. ............ 348/384.1
7,088,063 B2   8/2006  Kurosawa et al.

FOREIGN PATENT DOCUMENTS
JP    10-341588    12/1998
JP    2005-102447   4/2005
* cited by examiner

*Primary Examiner* — Karen Masih
(74) *Attorney, Agent, or Firm* — Mattingly & Malur, P.C.

(57) ABSTRACT

This invention provides a motor driving apparatus that made it possible to reduce torque ripples including those attributed to load variation of the motor and an associated method for control of motor revolution. An output stage to a multiphase DC motor is comprised of power elements to supply output voltages to multiphase coils and a predriver to supply drive voltages to the power elements. A resistor means detects a current flowing through the power elements. A supply current detector detects a voltage signal produced across the resistor means as a supply current, using a high-speed ADC and a moving average filter. An output controller generates a PWM signal with a frequency lower than the frequency of the high-speed ADC so that the current detected by the supply current detector conforms to a current signal indicating a motor revolving speed and transfers the PWM signal to the output stage.

11 Claims, 13 Drawing Sheets

MOTOR DRIVING APPARATUS AND METHOD FOR CONTROL OF MOTOR REVOLUTION

CROSS-REFERENCE TO RELATED APPLICATIONS

The disclosure of Japanese Patent Application No. 2007-216610 filed on Aug. 23, 2007 including the specification, drawings and abstract is incorporated herein by reference in its entirety.

BACKGROUND OF THE INVENTION

The present invention relates to a motor driving apparatus and a method for control of motor revolution and relates to a technique that is effectively used as a revolution control technique for a three-phase spindle motor of a hard disk drive (HDD), for example.

For driving the spindle motor of an HDD system, a soft switching method is used in which PWM is performed for two phases during current-conducting phase switching to suppress a steep change in current. In order to rotate a motor, detecting the motor position is needed. As a sensor-less method, it is known that the back electromotive force (BEMF) of the motor is detected during a non-conducting period following the current-conducting phase switching. Detecting zero crossing of an inductive load current is described in Japanese Unexamined Patent Publication No. Hei 10 (1998)-341588. A motor driving device and an integrated circuit device for motor driving adapted to reduce a variation in motor running torque are described in Japanese Unexamined Patent Publication No. 2005-102447.

The above Patent Document 2 was previously proposed by the present inventors. To solve problems in the above Patent Document 1 and the like, in Patent Document 2, output voltages are supplied to three-phase coils by a three-phase DC motor output stage including a predriver for supplying drive voltages to power MOSFETs. Current zero crossing detection is performed by monitoring whether the gate-source voltage of each of the power MOSFETs is equal to or greater than a predetermined voltage. Output of the current zero crossing detection is used for PLL control whereby the timing of current-conducting phase switching is controlled and a drive voltage with 180 degree (deg) conduction is created. The three-phase DC motor output stage including the predriver for supplying drive voltages to the power MOSFETs supplies the output voltages to the three-phase coils. In particular, it generates sinusoidal drive voltages with a waveform pattern in which a down hook for a lowest voltage phase which corresponds to GND and an up hook for a highest voltage phase which corresponds to power supply alternate per electric angle of 60 degree, the waveform being represented by a combination of linear functions. Thereby, sinusoidal currents flow through the three-phase coils.

[Patent Document 1]
Japanese Unexamined Patent Publication No. Hei 10 (1998)-341588

[Patent Document 2]
Japanese Unexamined Patent Publication No. 2005-102447

SUMMARY OF THE INVENTION

Figure 12:
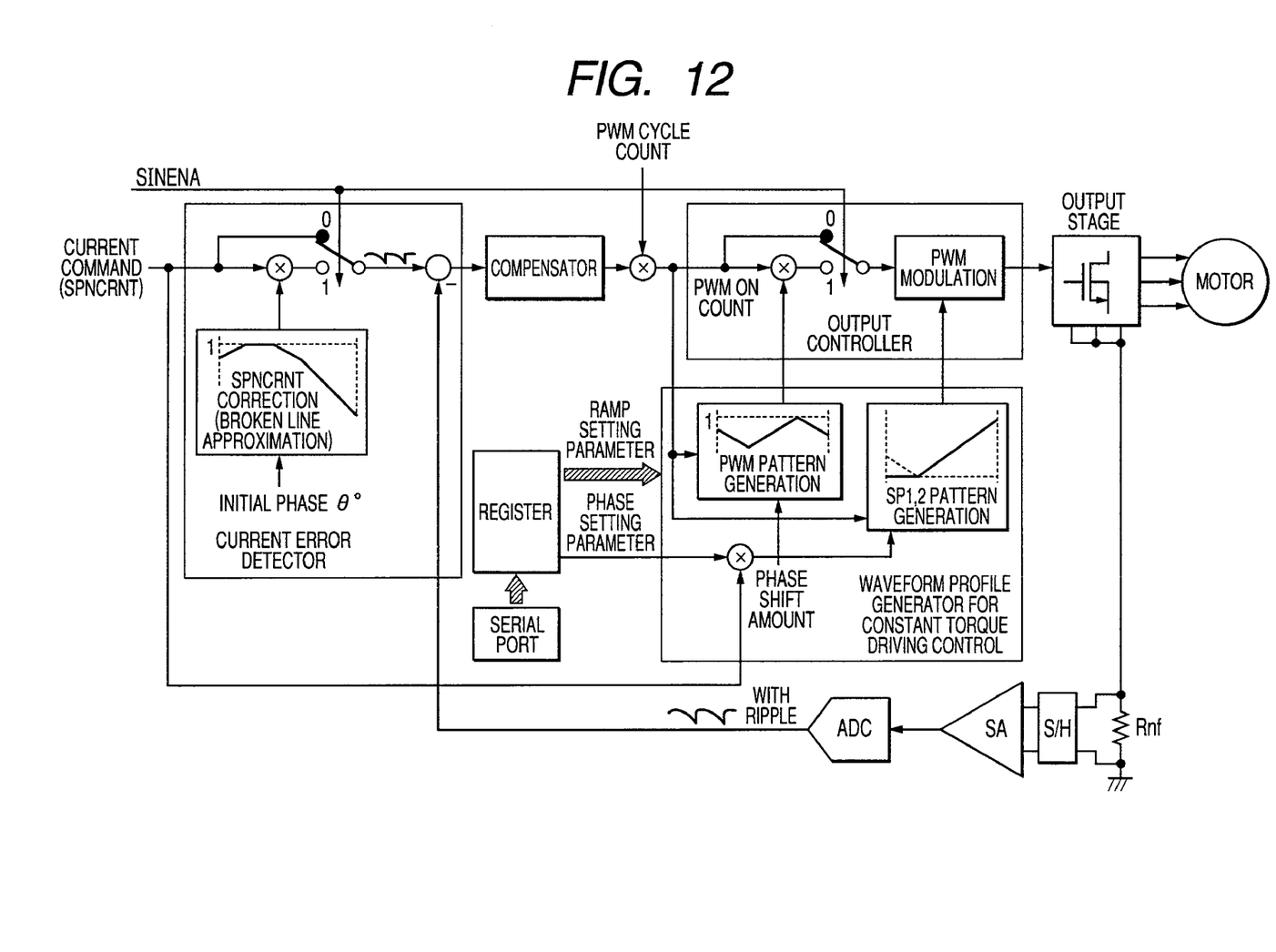
FIG. 12 is a block diagram of an example of an arrangement for motor driving of prior art.

In the technique of the above Patent Document 2, as is depicted in FIG. 12, in order to drive the three-phase DC motor with a proper torque, a motor drive current detected by a DC shunt resistor Rnf are used, PWM duty is controlled so that this current conforms to a current command, and PWM-CLK is output. The motor drive current detected by the DC shunt resistor Rnf is amplified by a sense amplifier SA and converted into a digital value by an analog/digital converter ADC. In a current error detector, a current error is obtained from a difference between the detected motor drive current value and the current command (SPNCRNT). Then, a PWM duty (Duty) is determined by a compensator.

By an output controller that executes PWM modulation, each phase is driven by a PWMCLK depending on the PWM duty. Supposing the case of constant torque driving, ripples will be observed in the current detected by the DC shunt resistor Rnf every electric angle of 60 deg, because a voltage pattern change occurs per electric angle of 60 deg for the sinusoidal motor drive current. Consequently, if the current command for DC is referred to as is in the current error detector, current detection errors will occur periodically and ripples will be introduced in the PWM duty. Even if it is tried to generate sinusoidal drive voltages for constant torque driving, exactly sinusoidal voltages cannot be produced due to the influence of the ripples. Hence, when constant torque driving is intended, anticipated ripples by the current detection are added to the current command for DC so that current detection errors do not occur. Thereby, it becomes possible to perform current control accurately and produce exactly sinusoidal voltages even if there are ripples in the detected current.

Figure 13:
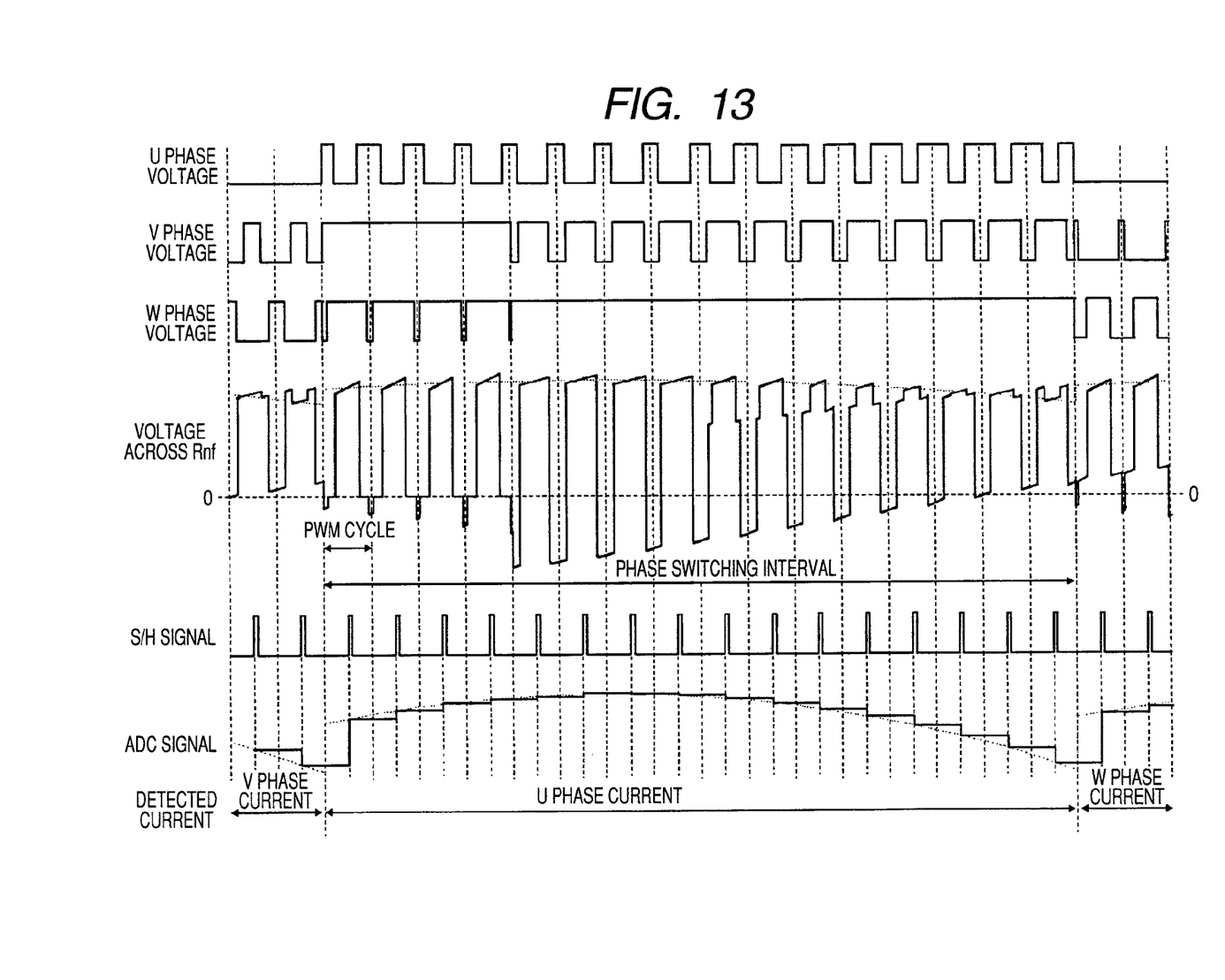
FIG. 13 shows waveforms observed in an operation of detecting a phase current in the arrangement of FIG. 12.

FIG. 13 shows waveforms observed during an operation of detecting a phase current, when a Nyquist ADC is used as the analog/digital converter ADC. By PWM modulating the sinusoidal voltages for three phases, the PWM duties of the waveforms of the U-phase, V-phase, and W-phase voltages change slightly over time. Due to this PWM operation, the voltage appearing across the DC shunt resistor Rnf changes depending on the on/off states of the three phases. For example, if the U phase is on at low level and the V and W phases are on at high level, a current flowing in the U phase appears in the voltage across the DC shunt resistor Rnf. Because the Nyquist ADC samples at the center of a PWM cycle, a current in one of the three phases is detected. This results in that ripples are observed in the ADC output every electric angle of 60 deg.

In Patent Document 2, however, a situation where the loads of the coils of the motor are uneven is not assumed. Even if such assumption is made, it is impossible to add ripples to counteract varying individual coil loads of the motor and, therefore, the influence of the ripples cannot be suppressed. Increased recording density of HDD units requires a further reduction in vibration during motor revolution. It is, therefore, very important to enable driving the motor with reduced torque ripples in spite of load variation of the spindle motor.

An object of the invention is to provide a motor driving apparatus that is simple in structure and has high performance and high functionality and an associated method for control of motor revolution. Another object of the invention is to provide a motor driving apparatus that made it possible to reduce torque ripples including those attributed to load variation of the motor and an associated method for control of motor revolution. The above-noted objects and other objects and novel features of the invention will become apparent from the description of the present specification and the accompanying drawings.

One embodiment of the invention disclosed herein is briefly described below. A motor driving apparatus includes the following means. An output stage to a multiphase DC motor is comprised of power elements to supply output voltages to multiphase coils and a predriver to supply drive voltages to the power elements. A resistor means detects a current flowing through the power elements. A supply current detector detects a voltage signal produced across the resistor means as a supply current, using a high-speed ADC and a moving average filter. An output controller generates a PWM signal with a frequency lower than the frequency of the high-speed ADC so that the current detected by the supply current detector conforms to a current signal indicating a motor revolving speed and transfers the PWM signal to the output stage.

Another embodiment of the invention disclosed herein is briefly described below. In the output stage to the multiphase DC motor, the predriver generates drive voltages and the power elements driven by the drive voltages supply output voltages to the multiphase coils. The resistor means detects a current flowing through the power elements. The motor revolving speed is controlled by driving the motor as follows: detecting a supply current from a voltage signal produced across the resistor means by using a high-speed ADC and a moving average filter; generating a PWM signal with a frequency lower than the frequency of the high-speed ADC so that the thus detected supply current conforms to a current command for controlling the motor revolving speed; and transferring the PWM signal to the output stage.

During a steady revolution state of a motor, there is almost one-to-one correspondence between supply current and motor toque. By detecting this supply current and using it for control of motor revolution, it becomes possible to reduce torque ripples including those attributed to load variation among motor coils.

DETAILED DESCRIPTION OF THE PREFERRED EMBODIMENTS

Figure 1:
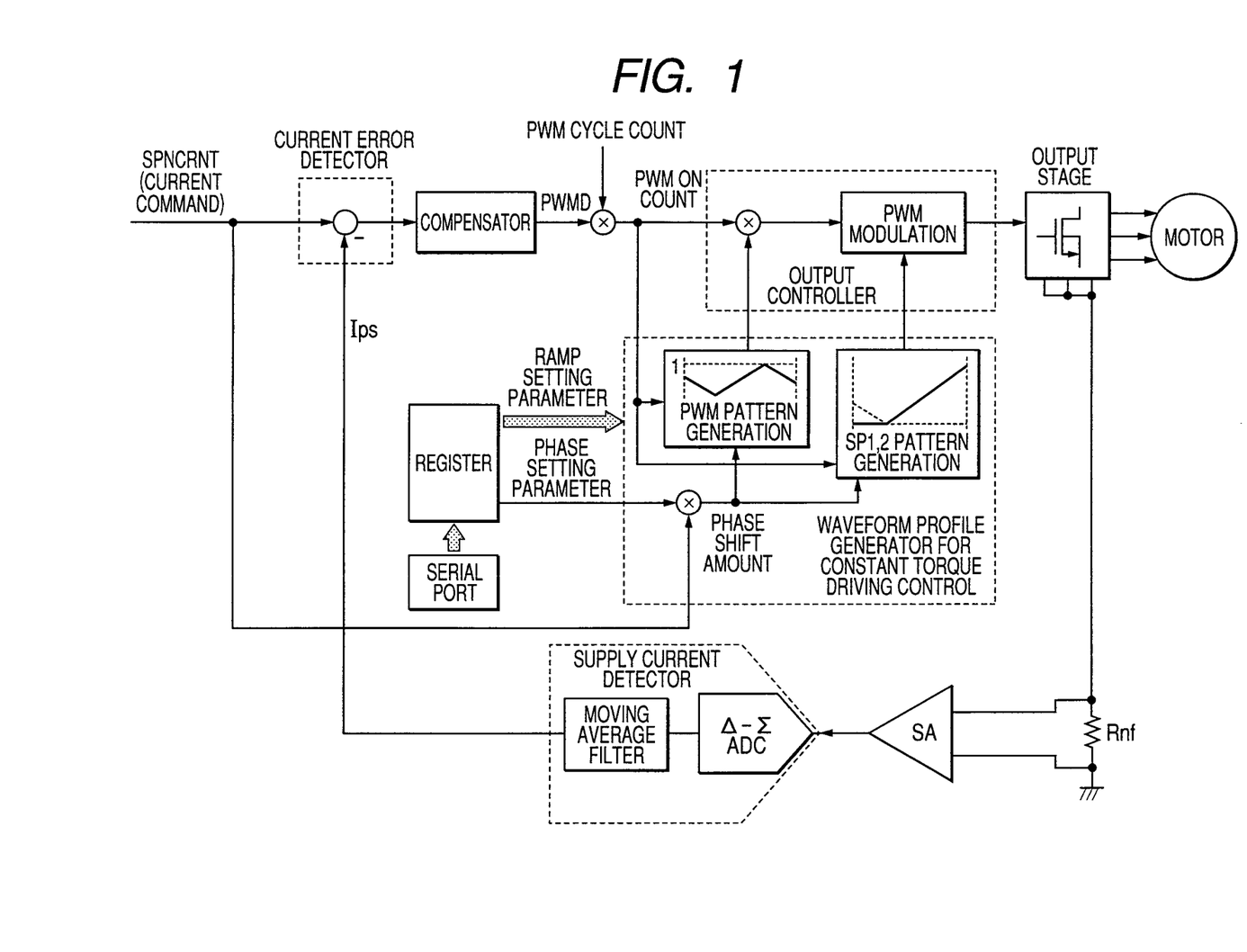
FIG. 1 shows a block diagram of a current control block that performs constant torque driving by 180 deg conduction in a motor driving apparatus according to the invention.

FIG. 1 shows a block diagram of a current control block that performs constant torque driving by 180 deg conduction in a motor driving apparatus according to the invention. To drive a three-phase DC motor with a proper torque, the current control block uses current values detected by a DC shunt resistor Rnf, controls the PWM duty so that the current value conforms to a current command, and outputs PWMCLK. The motor drive current detected by the DC shunt resistor Rnf is amplified by a sense amplifier SA and converted into a digital value at high speed by a digital/analog converter (hereinafter referred to as Δ-Σ ADC). The Δ-Σ ADC output passes through a moving average filter with a transmission zero set at a PWM frequency, whereby PWM frequency components are removed, and this output Ips is subjected to current error detection.

The output Ips of moving average filter is an average of the current flowing across the DC shunt resistor Rnf and, therefore, the detected current value corresponds to a supply current. That is, the above Δ-Σ ADC and moving average filter are constituent elements of a supply current detector. In a current error detector, a current error is obtained from a difference between the output Ips of the moving average filter and the current command SPNCRNT. Then, a PWM duty PWMD is determined by a compensator. An output controller that executes PWM modulation drives each phase by a PWM signal which depends on the PWM duty PWMD and waveform profiles for 180 deg conduction.

As is the case for the foregoing Patent Document 2, waveform profiles are created by a 180 deg conduction waveform profile generator. To this profile generator, a phase setting parameter and a ramp setting parameter of a waveform profile, which have been set in a register, are input through a serial port. Waveform profiles for three phases are generated; that is, a PWM pattern and SP1, SP2 patterns are generated. Through a current control loop as described above, the current control block operates to make the supply current Ips constant and drives the motor.

Figure 2A:
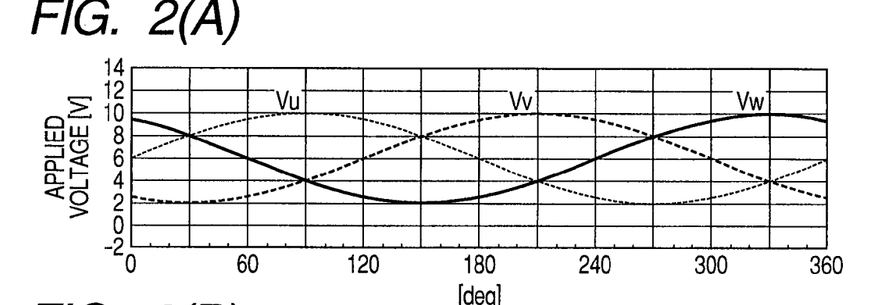
FIGS. 2A through 2D show waveforms of applied voltages allowing sinusoidal currents to flow in the motor in the present invention.
Figure 2B:
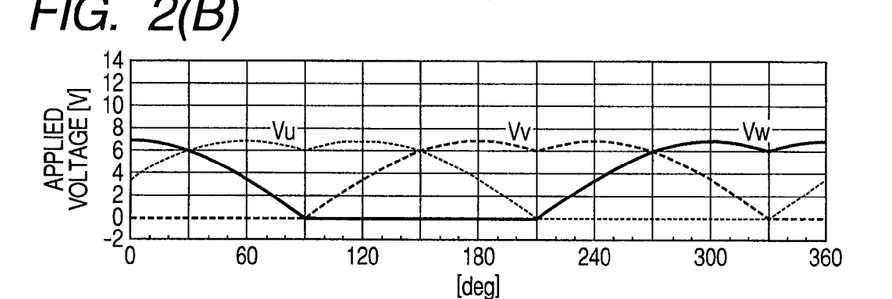
Figure 2C:
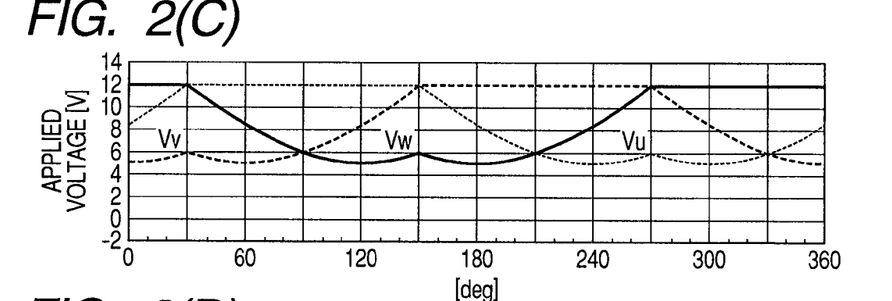
Figure 2D:
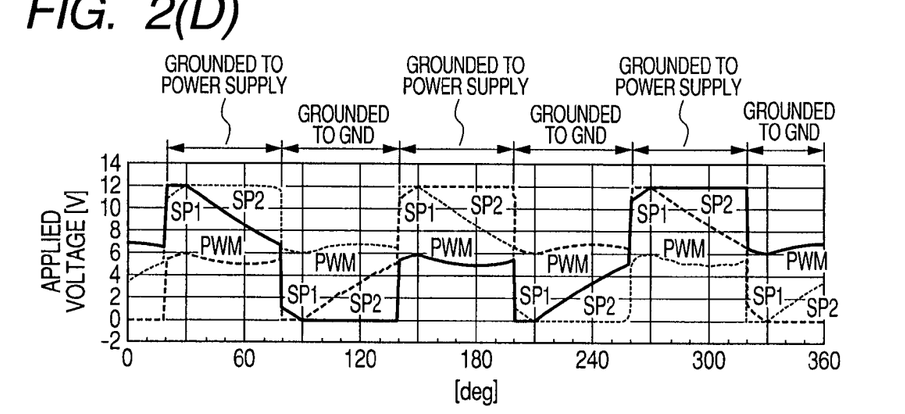

FIGS. 2A through 2D show waveforms of applied voltages allowing sinusoidal currents to flow in the motor. Given that a lowest voltage phase is set to "0" (grounded to GND) for three-phase drive voltages shown in FIG. 2A, the three-phase drive voltages will be as shown in FIG. 2B. Given that a highest voltage phase is set to a "power supply" (grounded to power supply) for the three-phase drive voltages, these voltages will be as shown in FIG. 2C. Here, if drive voltages are those in which a state grounded to GND and a state grounded to power supply alternate every electric angle of 60 deg as shown in FIG. 2D, a grounding point is alternately switched between GND and power supply every electric angle of 60 deg, while the voltages have up and down waveforms that alternate every electric angle of 60 deg. Accordingly, in the case of FIG. 2D, if drive voltages for an electric angle of 60 deg can be generated, three-phase sinusoidal voltages can be realized. The waveform profile generator generates profiles corresponding to such waveforms.

Voltage waveform patterns in which up and down waveforms alternate, which are generated when driving the motor with a constant torque, are generated by a controller for constant torque driving as described above; however, this controller is omitted in FIG. 1. If a switching drive with a constant current is performed to boost the toque just after starting the motor (constant torque driving is not performed) in the above-mentioned arrangement shown in FIG. 12, the switches may be switched (to the 0 position) using a signal SINENA, the driving circuit may operate with a PWM duty obtained by current control as is, and the current error detection may be switched to DC current control.

Power Pw of the spindle motor is expressed, using Ips for supply current, Vps for supply voltage, ω for angular frequency of motor, T for torque, Rm for coil resistance, Ispn for motor drive current, Psw for switching loss by PWM, as follows:

$$Pw = Vps \times Ips = T \times \omega + Ispn^2 \times Rm + Psw \quad (1)$$

For current control to make supply current Ips constant, the current control block operates to make the right-hand member of the above equation (1) constant. In a steady running state of the motor, the first term ($T \times \omega$) of the right-hand member of the above equation is dominating. Hence, by the current control, toque T can be made constant. Thereby, driving the motor with reduced torque ripples in spite of load variation of the motor can be accomplished.

Figure 3:
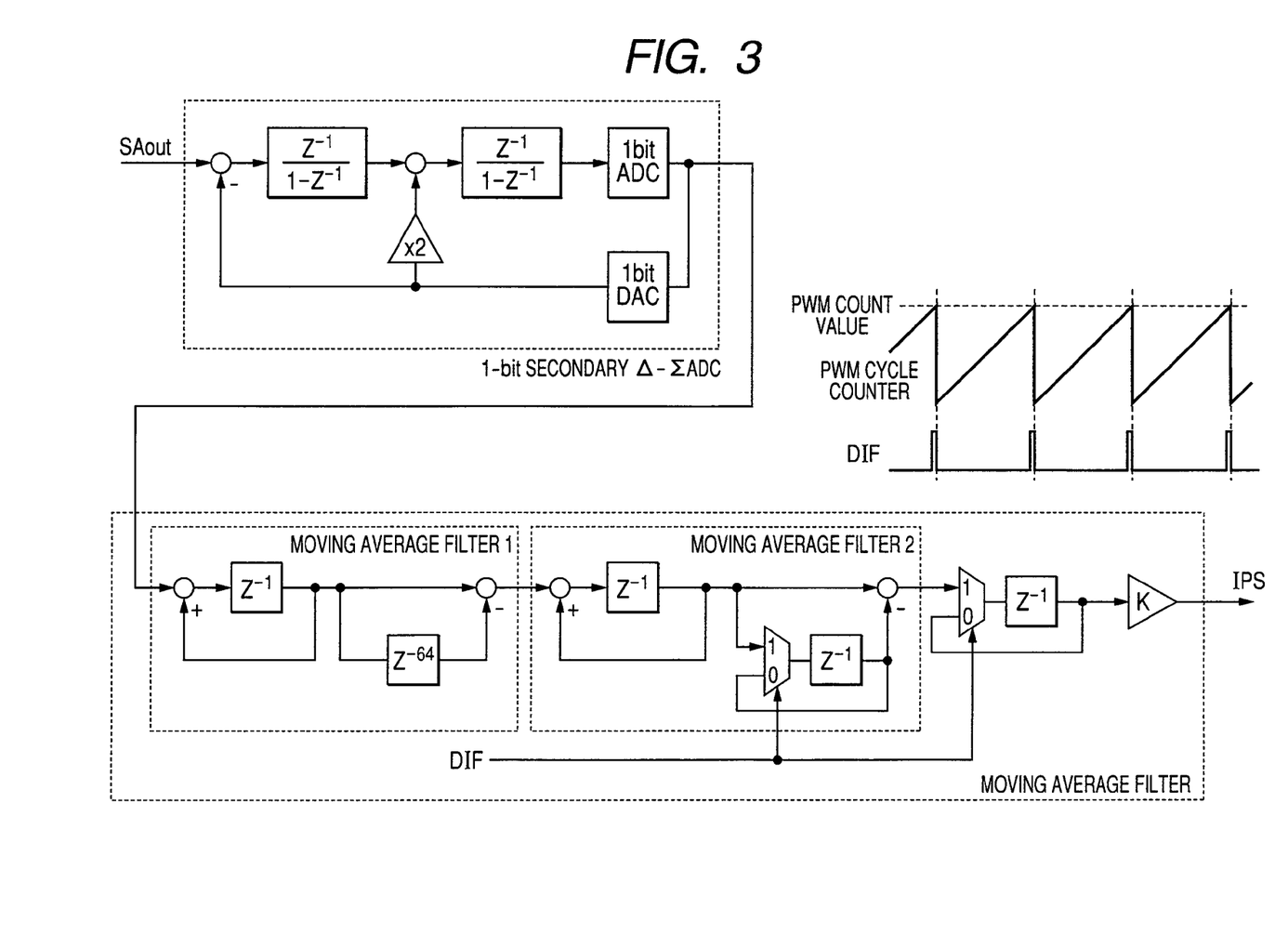
FIG. 3 is a block diagram of one embodiment of the Δ-Σ ADC and the moving average filter in FIG. 1.

FIG. 3 shows a block diagram of one embodiment of the $\Delta$-$\Sigma$ ADC and the moving average filter in FIG. 1. For the $\Delta$-$\Sigma$ ADC, a one-bit secondary $\Delta$-$\Sigma$ ADC with improved bit precision by high-speed sampling at, for example, about 20 MHz, is used. A suitable $\Delta$-$\Sigma$ ADC configuration can be selected according to required bit precision and over-sampling ratio to PWM cycles.

The ADC output is first input to a moving average filter 1 for approximately 64-time averaging. This is inserted to prevent the bit precision from deteriorating by a loopback noise and an average number of times is selected according to the bit precision required for current detection. An output signal of the moving average filter 1 is input to a moving average filter 2 synchronized with PWM cycles. Since PWM cycles are generated by a counter, by using a counter reset signal DIF to update the moving average filter 2, PWM frequency components can be removed completely.

As for a delay in the whole moving average filter, because of a small number of averaging times in the first stage, the supply current Ips can be detected in about a half of a PWM cycle. Because the moving average filter exists in the current control loop, it has only a small delay. Thus, the bandwidth for current control can be enhanced and the effect of suppressing supply current ripples, namely, torque ripples can be improved.

Figure 4:
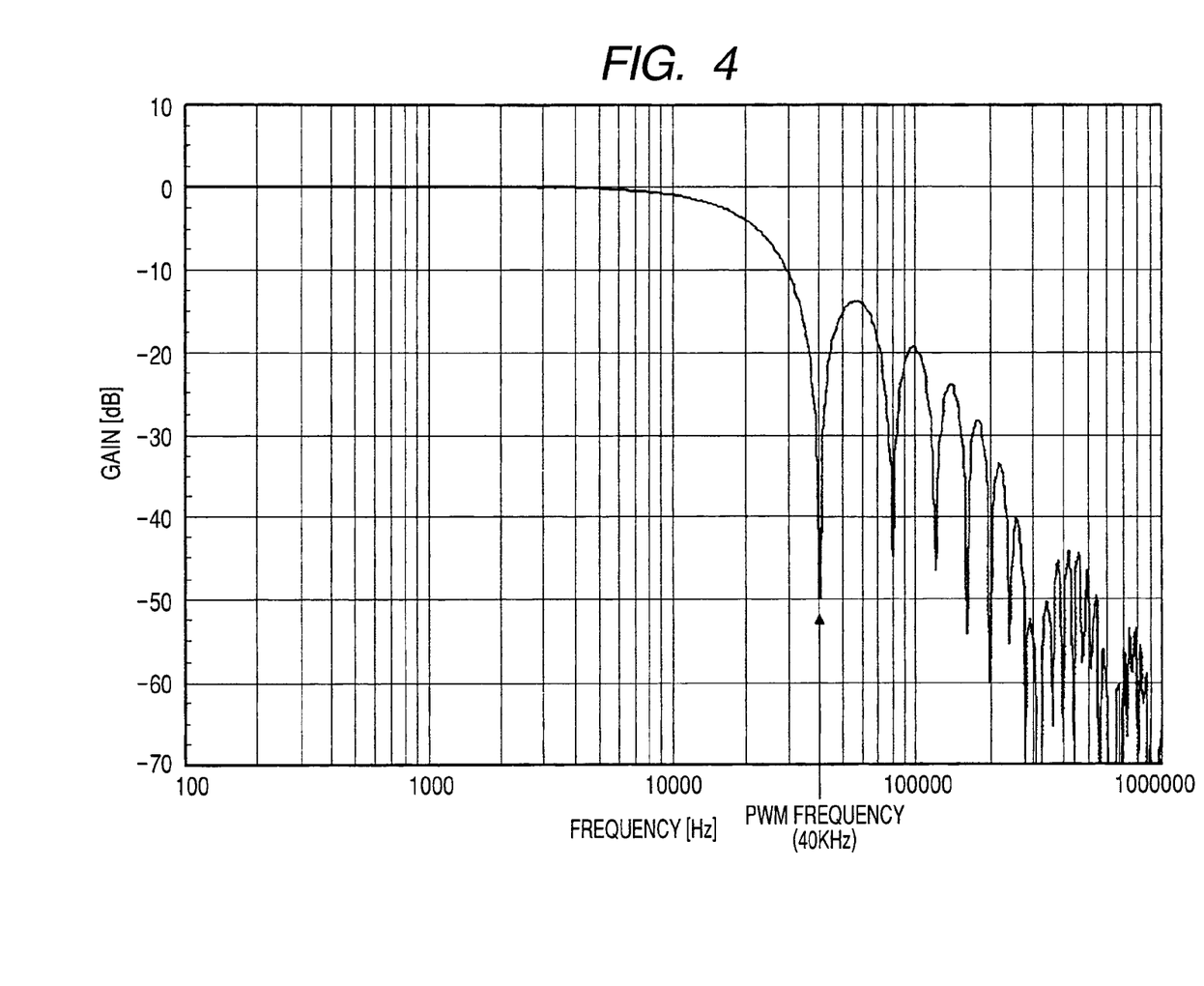
FIG. 4 shows a frequency characteristic of the moving average filter in FIG. 3.

FIG. 4 shows a frequency characteristic of the moving average filter in FIG. 3. The frequency characteristic is shown, assuming that the PWM frequency of the moving average filter in FIG. 3 is 40 KHz. Because of the transmission zero of the PWM frequency, PWM frequency components (40 KHz) can be removed completely. In this way, an average of current flowing across the DC shunt resistor Rnf is obtained and PWM components can be excluded from the detected current value Ips.

Figure 5:
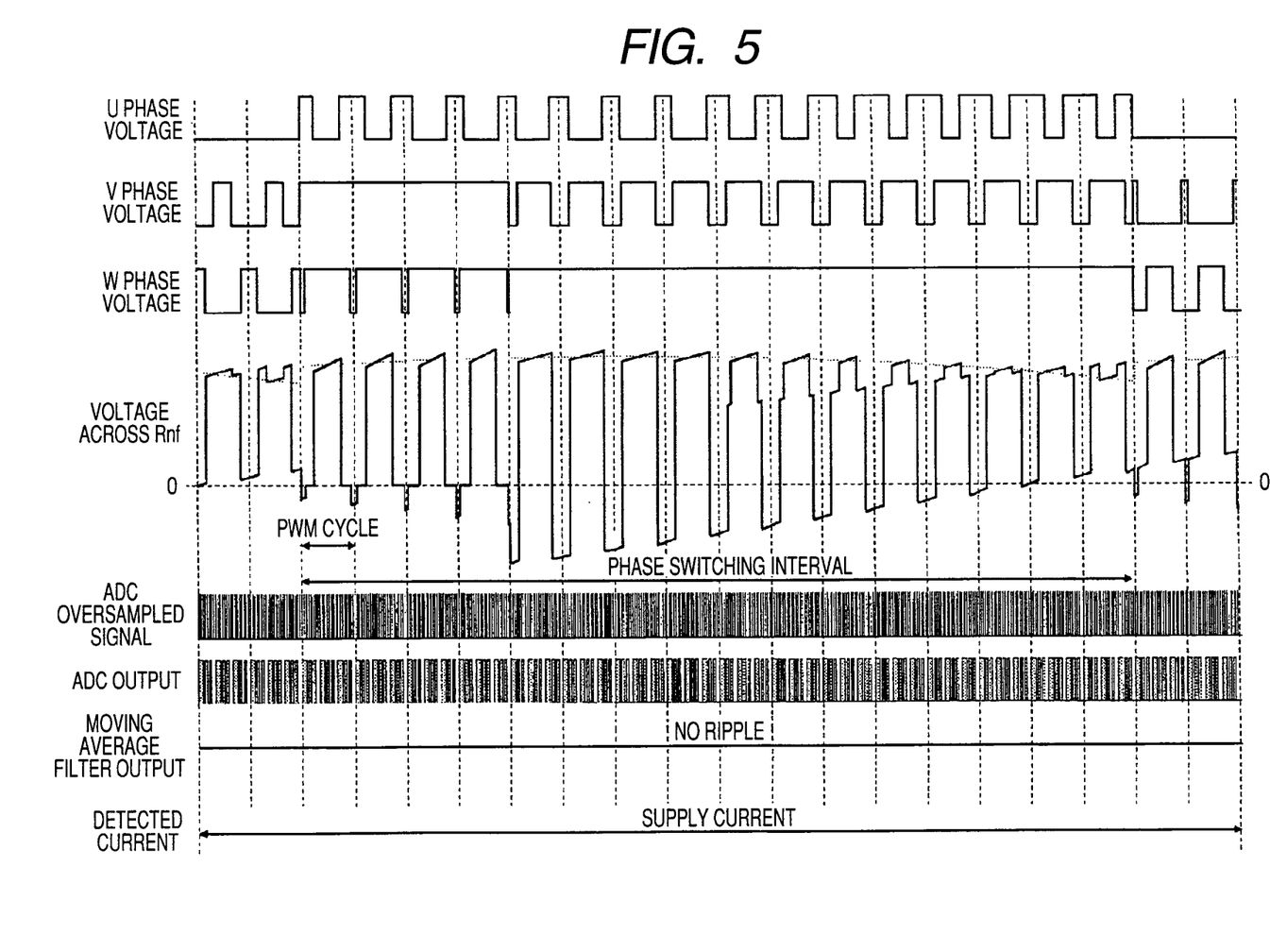
FIG. 5 shows waveforms observed in an operation of detecting a supply current using the Δ-Σ ADC in FIG. 1.

FIG. 5 shows waveforms observed in an operation of detecting a supply current using the $\Delta$-$\Sigma$ ADC in FIG. 1. By PWM modulating the sinusoidal voltages for three phases, the PWM duties of the waveforms of the U-phase, V-phase, and W-phase voltages change slightly over time. Due to the PWM operation, the voltage appearing across the DC shunt resistor Rnf changes depending on the on/off states of the three phases. For example, if the U phase is on at low level and the V and W phases are on at high level, a current flowing in the U phase appears in the voltage across the DC shunt resistor Rnf.

Since the $\Delta$-$\Sigma$ ADC operates at 20 MHz, if the PWM frequency is 40 KHz, the ADC operation is performed 500 times during one PWM cycle to acquire an ADC oversampled signal. Because the PWM frequency components are removed completely by the moving average filter, there is no nipple in the output of the moving average filter and the supply current can be detected accurately, whereas ripples would be observed every electric angle of 60 deg in the above-mentioned case where a phase current is detected using the Nyquist ADC as shown in FIG. 13. In the event that ripples occur in the torque due to load variation of the motor, the ripples appear in the supply current Ips. Thus, current control is performed to make the current Ips constant and the current control block operates to reduce the torque ripples. That is, in the above equation (1), because the supply voltage Vps is constant and $T \times \omega > Ispn^2 \times Rm + Psw$, there is one-to-one correspondence between supply current Ips and toque T. In other words, electric energy (Vps×Ips) supplied from the power supply is converted into rotational energy ($T \times \omega$).

Figure 6:
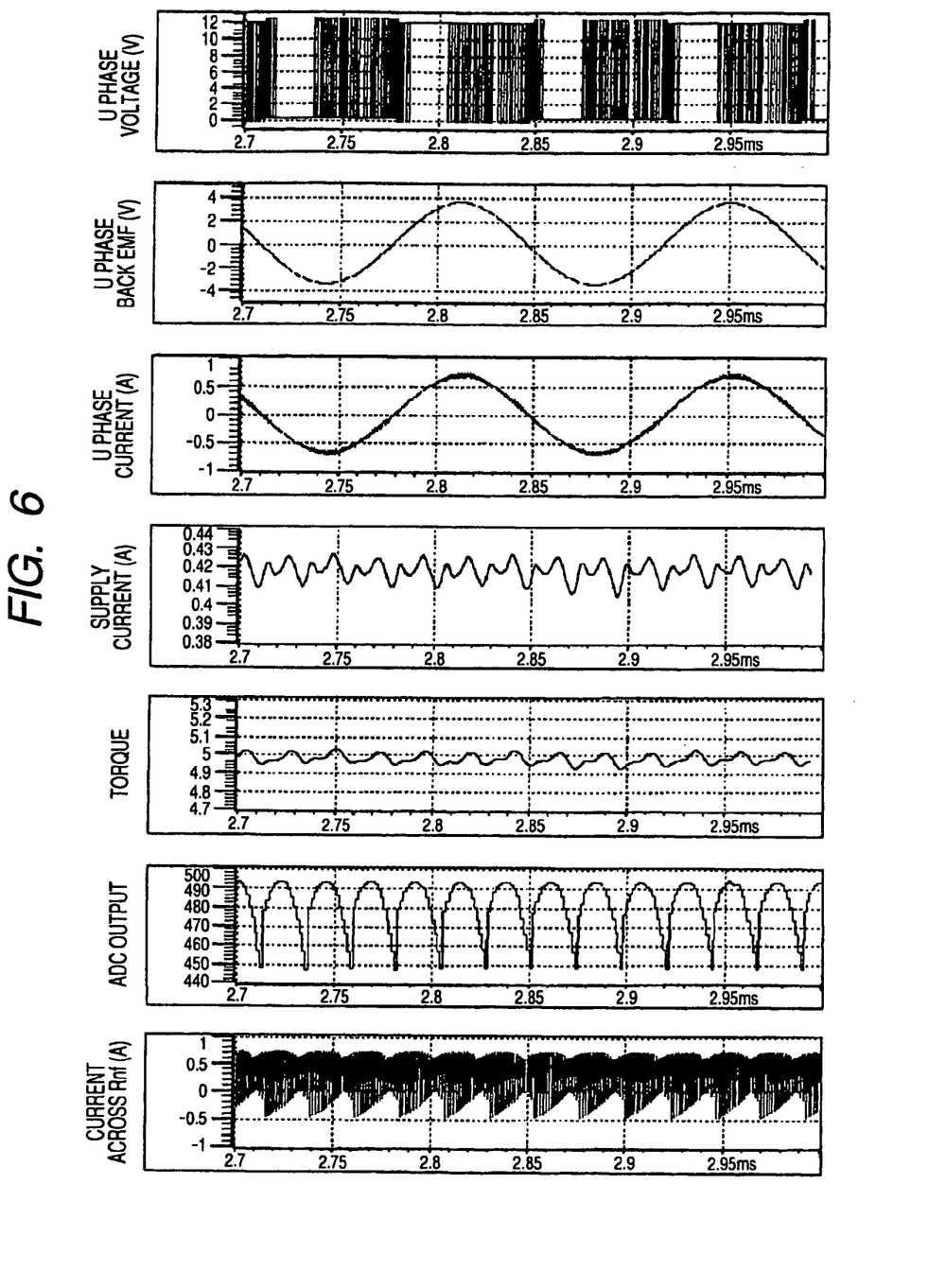
FIG. 6 shows one set of operating waveforms to explain the invention disclosed herein.

FIG. 6 shows one set of operating waveforms to explain the invention disclosed herein. This figure shows the operating waveforms created by computer simulation of the phase current control illustrated in FIG. 12. These waveforms are presented for the purpose of comparison with the supply current control according to the present invention. This figure explains current control for an instance where there is no load variation among the motor coils, in particular, there is no variation in back EMF. In the figure, U-phase voltage, U-phase back EMF, U-phase current, supply current, torque, ADC output, and current flowing across the DC shunt resistor Rnf are shown from top to down.

Each phase operates with a signal obtained by PMW modulation of drive voltages corresponding to the waveform profiles shown in FIG. 2D. Thus, the U-phase voltage has a PWM waveform shown in FIG. 2D. Since the U-phase drive voltage is sinusoidal as noted above and the back EMF is sinusoidal, the U-phase current is also a sinusoidal current. In the case where there is no variation in back EMF, the current control operates to reduce ripples in both the supply current and the toque. The current flowing across the DC shunt resistor Rnf is determined by the PWM state in each phase. As already noted, there are ripples every electric angle of 60 deg in the ADC output. In the above-mentioned arrangement for phase current control illustrated in FIG. 12, these ripples are corrected by SPNCRNT (broken line approximation).

Figure 7:
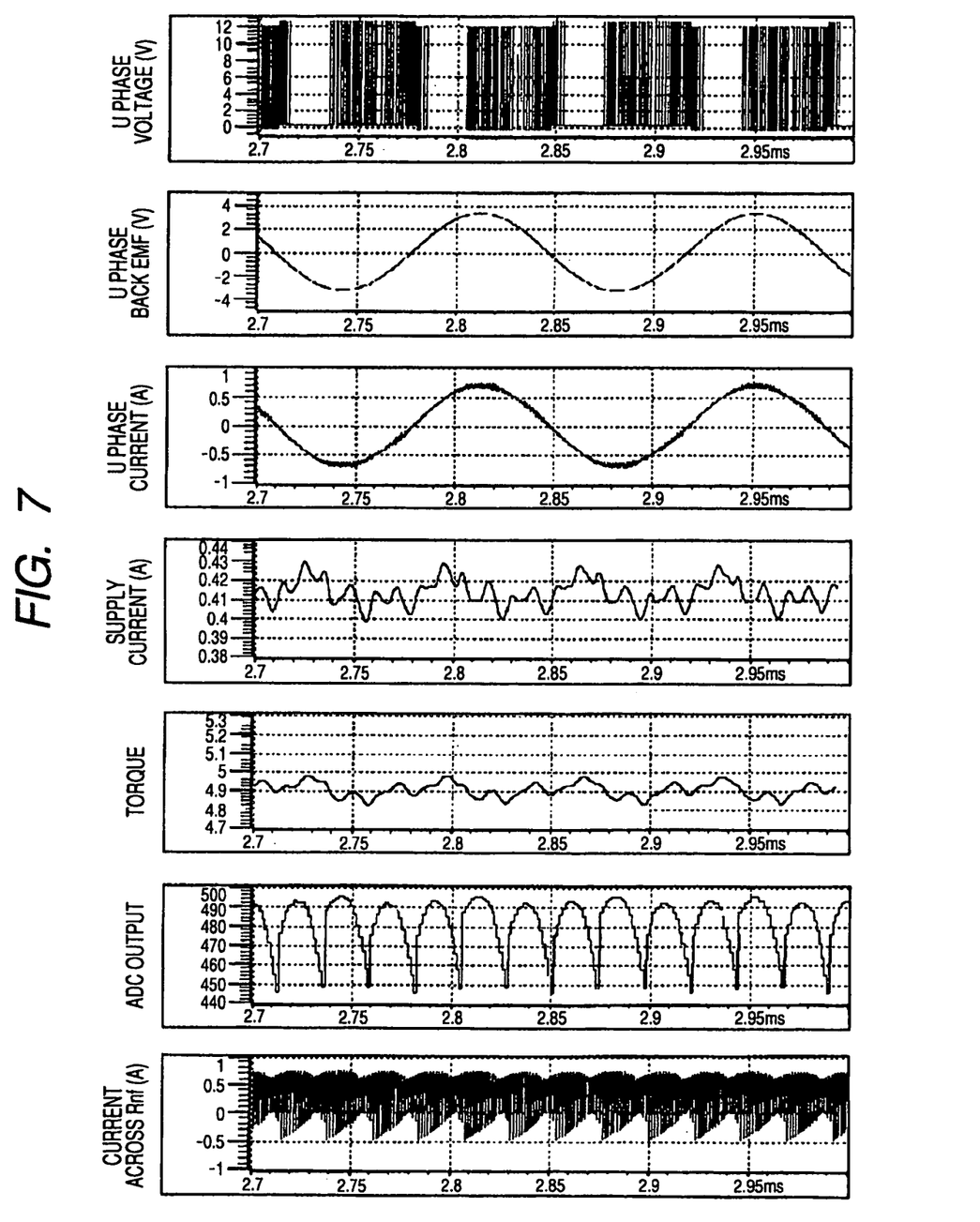
FIG. 7 shows another set of operating waveforms to explain the invention disclosed herein.

FIG. 7 shows another set of operating waveforms to explain the invention disclosed herein. This figure also shows the operating waveforms created by computer simulation of phase current control illustrated in FIG. 12 for an instance where there is load variation among the motor coils. In particular, in the case that back EMF is small only in the U phase, the torque constant in this phase decreases. In consequence, even if the phase current is made constant, the supply current and the torque are not made constant. Ripples in the supply current and the torque cause degradation more significantly than in the case that there is no variation.

Figure 8:
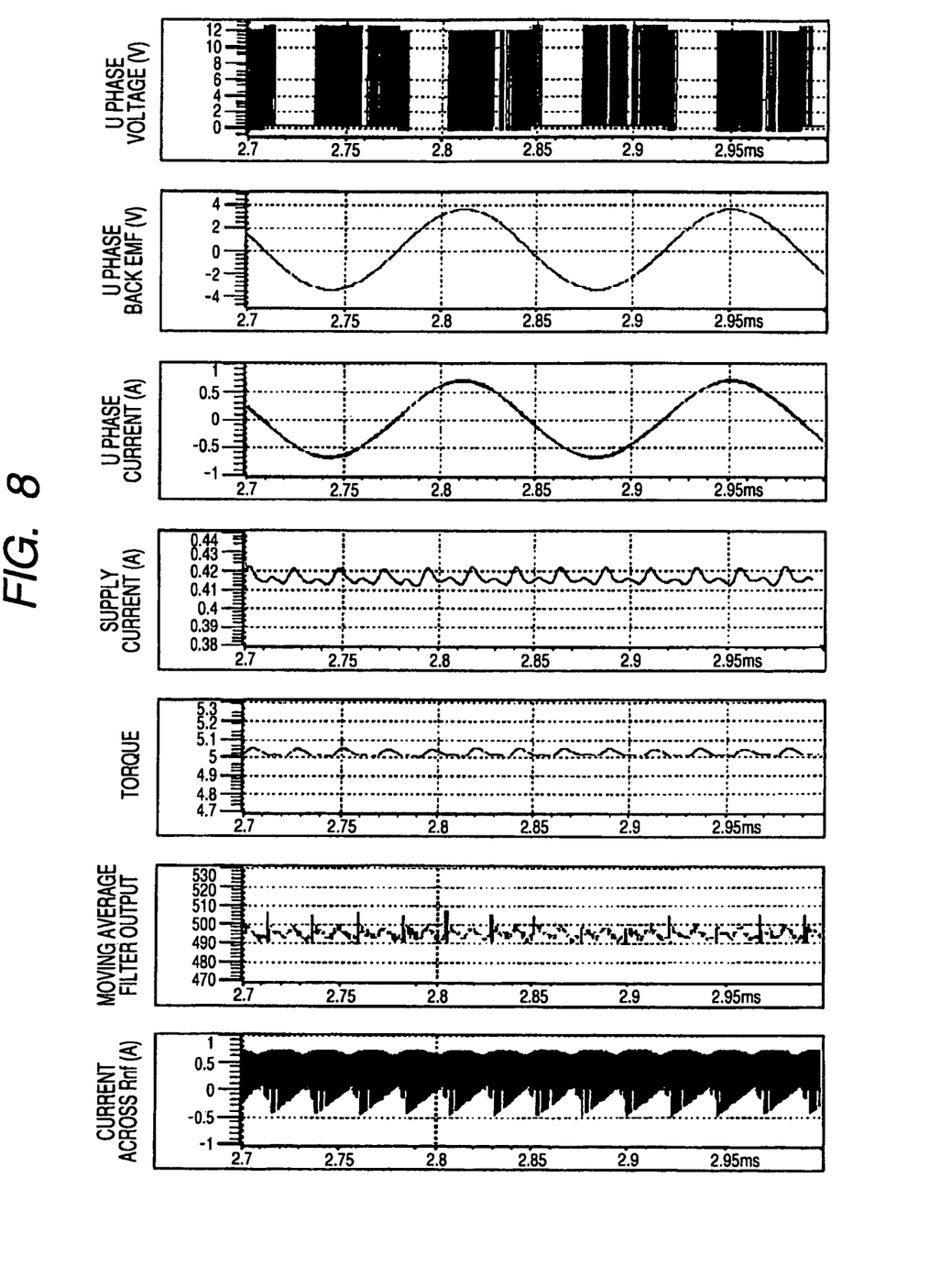
FIG. 8 shows one set of operating waveforms to explain the supply current control according to the invention disclosed herein.

FIG. 8 shows one set of operating waveforms to explain the supply current control according to the invention disclosed herein. This figure shows the operating waveforms created by computer simulation of the phase current control illustrated in FIG. 1. This figure explains current control for an instance where there is no load variation among the motor coils, in particular, there is no variation in back EMF, corresponding to FIG. 6. In the figure, U-phase voltage, U-phase back EMF, U-phase current, supply current, torque, ADC output, and current flowing across the DC shunt resistor Rnf are shown from top to down. By performing current control to make the moving average filter output which corresponds to the supply current constant, ripples in the supply current and toque can be suppressed.

Figure 9:
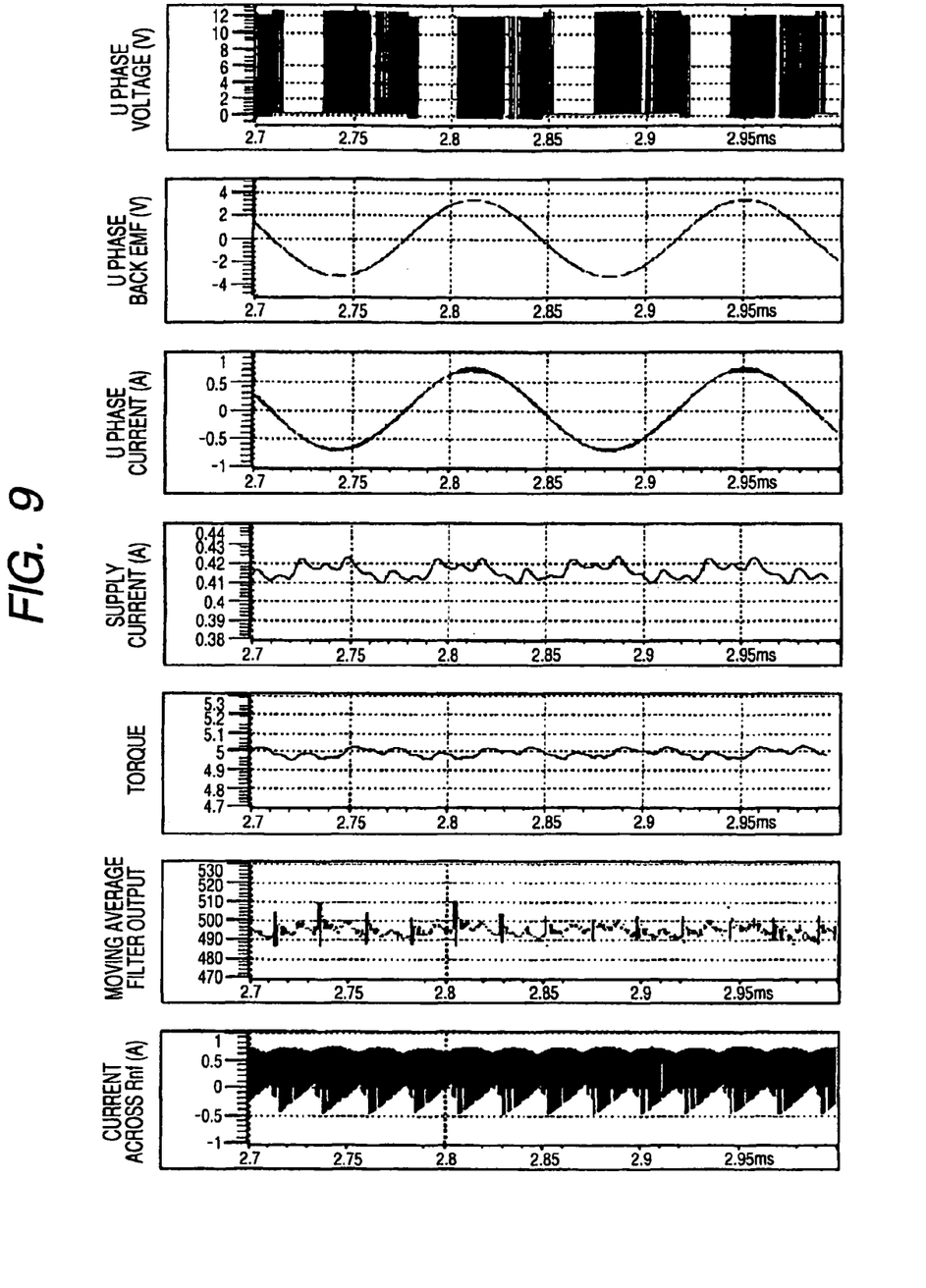
FIG. 9 shows another set of operating waveforms to explain the supply current control according to the invention disclosed herein.

FIG. 9 shows another set of operating waveforms to explain the supply current control according to the invention disclosed herein. This figure also shows the operating waveforms created by computer simulation of the phase current control illustrated in FIG. 1. This figure explains current control for an instance where there is load variation among the motor coils, in particular, back EMF is small only in the U phase. It is seen that the supply current control can suppress ripples in the supply current and torque as compared with the case of FIG. 7 by performing current control to make the moving average filter output which corresponds to the supply current constant in spite of load variation of the motor. Ripple components due to load variation of the motor occur as those that are n times as large as the back EMF. Owing to a small delay in the supply current detection of the present invention, the bandwidth for current control can be enhanced and a favorable effect of reducing torque ripples can be obtained.

Figure 10:
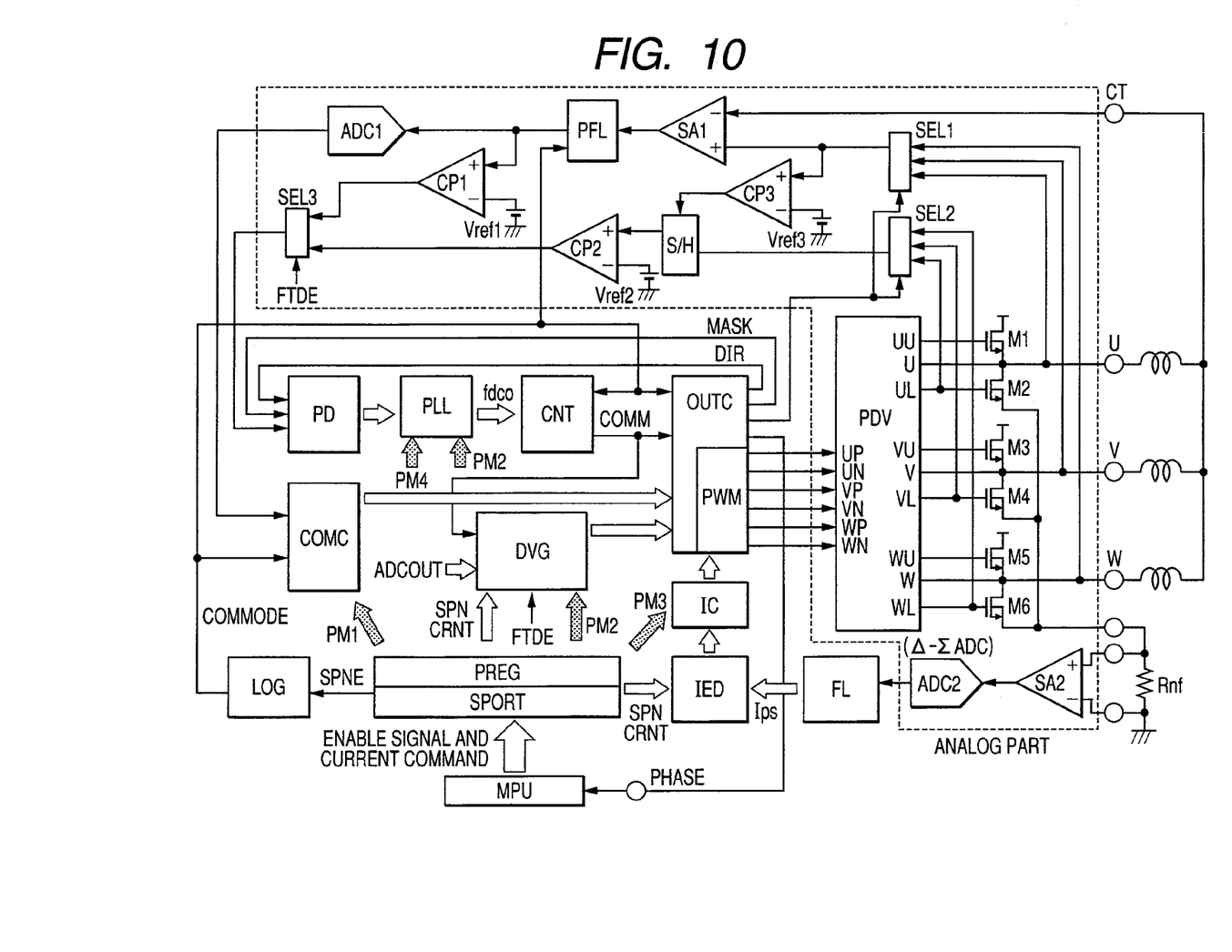
FIG. 10 is an overall block diagram of one embodiment of a motor driving apparatus according to the present invention.

FIG. 10 shows an overall block diagram of one embodiment of a motor driving apparatus according to the present invention. This embodiment is intended for constant torque driving of a three-phase motor as a multiphase motor by 180 deg conduction. The coils of the three-phase motor are driven by pulse width modulation (PWM) signals from the output stage comprised of power elements such as power MOSFETs M1-M6 and an output predriver. The output predriver operates, taking inputs of PWM modulated signals UP, UN, VP, VN, WP, WN. These signals are produced in the output controller by PWM modulation of sinusoidal drive voltages generated by a drive voltage profile generator.

Spindle output voltages U, V, W are input to a selector SEL1 that selects which phase in which BEMF is detected. A differential voltage between the SEL1 output and a neutral point CT of the motor is generated by a preamplifier SA1. The differential voltage generated by the preamplifier SA1 is filtered by a prefilter PFL. Then, the differential voltage is compared to a reference voltage Vref1 in a voltage comparator CP 1 and a zero crossing of BEMF is detected.

Gate voltages UL, VL, WL of lower power MOSFETs M2, M4, M6 are input to a selector SEL2 that selects which phase in which a current zero crossing is detected. The output of the selector SEL1 is compared to a reference voltage Vref3 in a voltage comparator CP3. The output of the selector SEL2 is sample-held by S/H during a crossing time, that is, the transition period of an output voltage. A voltage comparator CP2 compares the sample-held voltage and a reference voltage Vref2 and a zero crossing of current is detected.

Of these zero crossing outputs, which is to be used is selected by a selector SEL3. The current zero crossing detected is used, if driving by 180 deg conduction is performed; otherwise, the BEMF zero crossing detected is used. This is intended to use a stable start mode by BEMF detection when the motor runs at a low rate and its revolution is unstable.

The detected zero crossing which is output from the selector SEL3 is input to the phase error detector PD. By a PLL control loop comprised of a compensator PLL, a conduction timing counter CNT, the output controller OUTC (PWM), the predriver stage PDC, the power MOSFETs M1-M6, and the motor, motor driving with a low torque jitter is accomplished. The PLL control loop has a loop gain adjusting function in the case of using the current zero crossing.

When the current zero crossing is used to detect a phase error, there is no need for a non-conducting period which is provided when BEMF is detected and, thus, 180 deg conduction can be achieved. Motor driving with a virtually constant torque and with reduced torque ripples can be accomplished with sinusoidal drive voltages. Meanwhile, current detection is performed using the DC shunt resistor Rnf. A voltage detected by the DC shunt resistor Rnf is amplified by the sense amplifier SA1 and input to the Δ-Σ ADC (ADC2) that performs oversampling at high speed. Output of the Δ-Σ ADC is input to the moving average filter FL with a transmission zero at the PWM frequency. A supply current Ips from which PWM frequency components have been removed completely can be detected.

Output Ips of the moving average filter FL which corresponds to the supply current is input to the current control error detector IED where an error of the current as a difference from a current command SPNCRNT is calculated. By the current control loop comprised of the current control compensator IC, output controller OUTC (PWM), predriver stage PDV, power MOSFETs M1-M6, and the motor, control is performed to make the supply current Ips constant. In the current control error detector IED, an error as a difference from the current command SPNCRNT is calculated. A detailed block diagram including the current control compensator IC and the output controller OUTC (PWM) is shown in FIG. 1.

For motor speed control, a PHASE signal that is a periodic signal proportional to the number of revolutions is output by the output controller OUTC. This signal is compared to a target speed by a microcomputer or microprocessor MPU. A current command SPNCRNT in accordance with the speed is created and input through the serial port SPORT.

Interfacing with the microcomputer or microprocessor MPU is performed by the serial port SPORT. Parameters PM1-PM5 are set by the register PREG. Parameters such as a current command (SPNCRNT), current control, PLL, drive voltage profiles for 180 deg conduction are set by the register. The apparatus further includes a COMSENS controller COMC which controls starting from the motor stop state as a spindle control system and a sequencer LOG which controls internal operation. To the COMSENS controller COMC, output of the prefilter PFL, after converted into a digital value by the ADC 1, is input. The PM1 is a parameter for COMSENS control. The PM2 is a parameter for loop gain adjustment. The PM3 is a parameter for current control. The PM 4 is a parameter for PLL control.

Figure 11:
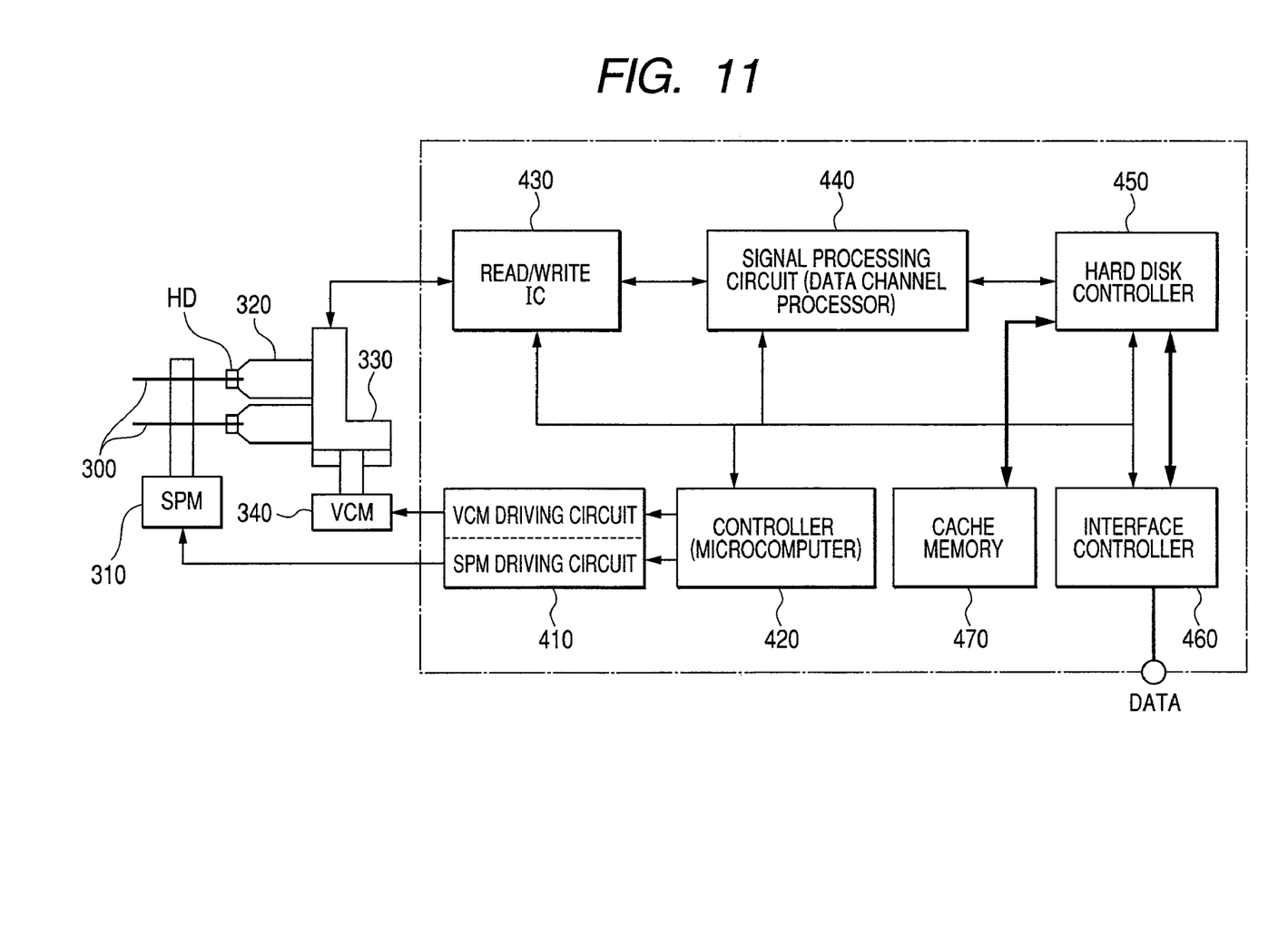
FIG. 11 is a block diagram of an example of configuration of hard disk equipment as a whole using a motor driving control circuit to which the present invention is applied.

FIG. 11 shows a block diagram of one example of configuration of hard disk equipment as a whole, as an example of a magnetic disk system including a spindle motor control unit using a motor driving control circuit to which the present invention is applied, a voice coil motor control unit, and a magnetic head driving control unit. In FIG. 11, reference numeral 310 denotes a spindle motor that rotates a magnetic disk 300; reference numeral 320 denotes arms, each having a magnetic head HD at its leading end (a magnetic write head and a magnetic read head are included); reference numeral 330 denotes a carriage on which the arms 320 are rotatably supported. The voice coil motor 340 moves the carriage 330, thereby moving the magnetic heads, and the motor driving control circuit 410 performs servo control to align the center of a magnetic head to the center of a track.

The motor driving control circuit 410 a semiconductor integrated circuit in which a spindle motor driving control circuit having functions as described in the foregoing embodiment and a voice coil motor driving control circuit that moves the magnetic heads in a radial direction of the disk are integrated. This circuit operates in accordance with a control signal supplied from a controller 420 and performs servo control of the voice coil motor 340 and the spindle motor 310 to seek a desired track and move the appropriate magnetic head to the desired track and to make the relative speed of each magnetic head constant. In this case, the above-mentioned power MOSFETs M1-M6 may be external elements or built in the semiconductor integrated circuit. Since elements that carry a large drive current are hard to incorporate into the semiconductor integrated circuit, it is desirable to provide them as external elements as above.

Reference numeral 430 denotes a read/write IC that amplifies a current in accordance with a change in magnetism detected by the magnetic head HD and sends a read signal to a signal processing circuit (data channel processor) 440 as well as amplifies a write pulse signal from the signal processing circuit 440 and outputs a drive current for the magnetic head HD.

Reference numeral 450 denotes a hard disk controller that takes in read data sent from the signal processing circuit 440 and performs error correction as well as performs error correction and coding of write data from a host and outputs it to the signal processing circuit 440. The signal processing circuit 440 performs modulation/demodulation processing suitable for digital magnetic recording and signal processing such as waveform shaping taking magnetic recording characteristics into account as well as reads positional information from a read signal by the magnetic head HD.

Reference numeral 460 denotes an interface controller that transfers data from the present system to an external device and vice versa and performs transfer-related control. The hard disk controller 450 is coupled via the interface controller to a host computer such as a microcomputer within a personal computer main body. Reference numeral 470 denotes a cache memory for a buffer that temporarily stores read data which has been read at a high rate from a magnetic disk. A system controller 420 comprising a microcomputer determines which operation mode based on a signal from the hard disk controller 450 and controls each part of the system according to the operation mode as well as calculates a sector position based on address information supplied from the hard disk controller 450.

In the foregoing embodiment, as described in the above-mentioned Patent Document 2 also, a zero crossing of a current waveform is detected by determining whether a gate-source voltage Vgs is present in the output power MOSFETs during a transition period of an output voltage, during which PWM operation is performed. By using the current zero crossing, 180 deg conduction without an non-conducting period of the motor can be accomplished. Also, phase error detection in PLL control utilizes detection results depending on whether the gate-source voltage Vgs is present during an output transition period. As a phase error, by using a quantity proportional to a difference of the number of detected polarity changes of a drive current during an error detection period, it is possible to perform PLL control not affected by detection offsets and drive current ripples which occur in actual operation. Further, supply current control to counteract load variation of the motor is accomplished and ripples in the motor driving torque can be reduced significantly.

By provision of the selector for selecting either BEMF zero crossing or current zero crossing as motor position information, it is possible to start the motor by driving mode by conventional BEMF detection during unstable motor rotation at a low rate. By the gain adjustment function included in the PLL control, it is possible to perform operation with the same loop characteristics whether BEMF zero crossing or current zero crossing is used and it is possible to suppress degradation by torque jitter or the like. Drive voltages have waveform patterns in which up and down waveforms that alternate every electric angle of 60 deg. By representing these patterns by linear approximation, highly accurate sinusoidal drive voltages can be obtained by a simple structure and motor driving with a constant torque can be achieved.

In these patterns, as up and down waveforms alternate every electric angle of 60 deg, current waveforms can have a good up and down symmetrical property. This can prevent second-order distortion components of torque ripples. By provision of a phase setting register and a ramp setting, drive voltage phases and drive voltage distortion can be adjusted independently of the motor and it is possible to drive the motor with an optimum torque. A method of adjusting drive voltage distortion by changing the ramp of up and down waveforms that alternate every electric angle of 60 deg makes it easy to insert a sixth-order distortion. Therefore, this method is effective in compensating the influence of distortion components (mainly, a fifth-order and seventh-order combination) that exist in BEMF. In drive current control, by superposing anticipated ripple components on waveforms by a current command, current control can be performed without giving rise to a current detection error. Thereby, it is possible to attain sinusoidal drive currents.

The motor driving apparatus to which the present invention is applied accomplishes 180 deg conduction without a non-conducting period. By detecting the supply current and controlling the motor revolution, it is possible to reduce torque ripples against load variation of the motor and to also reduce noise and vibration of the motor. Owing to 180 deg conduction, it is possible to reduce ripples in the supply current to HDD equipment and to couple more HDDs to the power supply. By the phase error detection method not affected by detection offsets and drive current ripples, 180 deg conduction can be attained even for relatively small motors such as a motor for a smaller number of disks and a motor with a low number of revolutions.

While the invention made by the present inventors has been described specifically based on its embodiments hereinbefore, it will be appreciated that the present invention is not limited to the described embodiments and various modifications may be made without departing from the gist of the invention. For example, the high-speed ADC employed is solely required to perform sampling at a sufficiently high rate relative to the PWM frequency and attain desired bit precision. Although a one-bit secondary Δ-Σ ADC is used in the described embodiment, the number of bits and order can be changed according to characteristics. The moving average filter employed is solely required to have the capability of removing PWM frequency components completely and any other type of filer may be used, provided it has a transmission zero at the PWM frequency.

To detect a current zero crossing for implementing 180 deg conduction, it is determined whether a gate-source voltage Vgs is present in the lower power MOSFETs M2, M4, and M6; alternately, it may be determined whether a gate-source voltage Vgs is present in the upper power MOSFETs M1, M3, and M5. In the latter case, it should be determined whether a respective voltage between terminals UU and U, terminals VU and V, and terminals WU and W of the output stage is larger than a threshold voltage Vth for the MOSFETs. The power MOSFETs may be built in the integrated circuit for motor driving or provided as external terminals, as noted above.

The driving mode is not only 180 deg conduction without a non-conducting period; alternatively, a driving mode may include only a fractional non-conducting period (about 10 deg) for detecting a BEMF zero crossing. Even in the latter mode, the effect is obtained which reduces torque ripples against load variation of the motor by detecting the supply current and controlling motor revolution. Further, motor position detection may be accomplished using a sensor such as a hall element, as an alternative to using a current zero crossing as described above. The power MOSFETs as the power elements may be replaced with other elements such as bipolar transistors.

The present invention can widely be used for motor driving apparatus and as the method for control of motor revolution.

What is claimed is:

1. A motor driving apparatus comprising:
    an output stage to a multiphase DC motor including power elements to supply output voltages to multiphase coils and a predriver to supply drive voltages to the power elements;
    a resistor means for detecting a current flowing through said power elements;
    a supply current detector that detects a voltage signal produced across said resistor means as a supply current, using a high-speed ADC and a digital filter; and
    an output controller that generates a PWM signal with a frequency lower than the frequency of said high-speed ADC so that the current detected by said supply current detector conforms to a current command for controlling the motor revolving speed, and transfers the PWM signal to said output stage.

2. The motor driving apparatus according to claim 1, wherein said high-speed ADC is a Δ-Σ ADC that performs oversampling at a higher frequency than the frequency of said PWM signal.

3. The motor driving apparatus according to claim 1, wherein said digital filter is a moving average filter with a transmission zero set at the frequency of said PWM signal.

4. The motor driving apparatus according to claim 2, wherein said digital filter is a moving average filter with a transmission zero set at the frequency of said PWM signal.

5. The motor driving apparatus according to claim 4,
    wherein said power elements include upper power elements coupled to a supply voltage and lower power elements coupled to a ground potential, and
    wherein said resistor means is a DC shunt resistor disposed between a common connection node for said lower power elements and the ground potential.

6. The motor driving apparatus according to claim 4, further comprising:
    a current zero crossing detector that monitors whether a respective voltage to drive each of said power elements is equal to or greater than a predetermined voltage and detects a current zero crossing; and
    a profile generator that generates a drive voltage of 180 degree conduction, using the output of said current zero crossing detector for phase locked loop control that controls timing of conduction phase switching,
    wherein said output controller receives the drive voltage generated by said profile generator and generates a PWM signal to be transferred to said output stage.

7. The motor driving apparatus according to claim 6, further comprising:
    a back EMF zero crossing detector that selects a non-conducting phase and detects a back EMF zero crossing; and
    a selector that selects said back EMF zero crossing detector during low revolution, when the motor revolution is unstable, and transfers the back EMF zero crossing to said phase locked loop control, or selects said current zero crossing detector during high revolution at a higher number of revolutions than the low revolution, when the motor revolution falls in a stable region, and transfers the current zero crossing to said phase locked loop control.

8. The motor driving apparatus according to claim 7, wherein said current zero crossing detector includes a comparator that compares a gate-source voltage in said lower power elements to a reference voltage that is equal to or less than a threshold voltage of said lower power elements and greater than 0 V.

9. The motor driving apparatus according to claim 7, wherein phase error detection in said phase locked loop control uses as a phase error a quantity proportional to a difference of the number of detected polarity changes of a drive current during an error detection period.

10. The motor driving apparatus according to claim 9,
    wherein said output stage to the multiphase DC motor is the output stage to a three-phase DC motor having three-phase coils, and
    wherein said profile generator generates a sinusoidal drive voltage with a waveform pattern in which a down hook for a lowest voltage phase which corresponds to GND and an up hook for a highest voltage phase which corresponds to power supply alternate every electric angle of 60 degree, and the waveform is represented by linear approximation.

11. A method for control of motor revolution in an arrangement comprising:
    an output stage to a multiphase DC motor including power elements to supply output voltages to multiphase coils and a predriver to supply drive voltages to the power elements: and
    a resistor means for detecting a current flowing through said power elements,
    said method comprising the steps of:
    detecting a voltage signal produced across said resistor means as a supply current by using a high-speed ADC and a moving average filter;
    generating a PWM signal with a frequency lower than the frequency of said high-speed ADC so that the thus detected supply current conforms to a current command for controlling the motor revolving speed; and
    transferring the PWM signal to said output stage for control of the motor revolving speed.

* * * * *